US009765227B2

(12) United States Patent
Grigorenko et al.

(10) Patent No.: US 9,765,227 B2
(45) Date of Patent: Sep. 19, 2017

(54) COATING COMPOSITIONS FOR SECURITY ELEMENTS AND HOLOGRAMS

(71) Applicant: BASF SE, Ludwigshafen (DE)

(72) Inventors: Nikolay A. Grigorenko, Basel (CH); Michelle Richert, Illzach (FR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/224,789

(22) Filed: Aug. 1, 2016

(65) Prior Publication Data
US 2016/0355693 A1 Dec. 8, 2016

Related U.S. Application Data

(63) Continuation of application No. 13/511,582, filed as application No. PCT/EP2010/067898 on Nov. 22, 2010, now Pat. No. 9,453,132.

(30) Foreign Application Priority Data

Nov. 27, 2009 (EP) .................................... 09177328

(51) Int. Cl.
B41M 3/14 (2006.01)
B44F 1/12 (2006.01)
(Continued)

(52) U.S. Cl.
CPC ............ C09D 11/037 (2013.01); B05D 3/007 (2013.01); B41M 3/148 (2013.01); B44F 1/14 (2013.01);
(Continued)

(58) Field of Classification Search
CPC ...... C09D 5/29; C09D 7/1275; C09D 11/101; C09D 7/1266; C09D 7/1291; B41M 3/148
See application file for complete search history.

(56) References Cited

U.S. PATENT DOCUMENTS 4,116,710 A 9/1978 Heikel
4,321,087 A 3/1982 Levine et al.
(Continued)

FOREIGN PATENT DOCUMENTS

EP 2 009 516 A2 12/2008
GB 1 465 908 3/1977
(Continued)

OTHER PUBLICATIONS

Xue, C., et al., "Self-Assembled Monolayer Mediated Silica Coating of Silver Triangular Nanoprisms", Advanced Materials, vol. 19, pp. 4071-4074 (2007).
(Continued)

Primary Examiner — Kelly M Gambetta
(74) Attorney, Agent, or Firm — Oblon, McClelland, Maier & Neustadt, L.L.P.

(57) ABSTRACT

The present invention relates to the use of coating compositions, comprising shaped transition metal, especially silver, particles and a binder, wherein the ratio of pigment to binder is preferably such that the resulting coating shows an angle dependent color change, for the production of security elements and holograms. When the coating compositions of the present invention are used in coating a hologram the obtained products show a an angle dependent color change (flip/flop effect), different colors in reflection and transmission, an extremely bright OVD image and extremely strong rainbow effect, high purity and contrast.

17 Claims, 1 Drawing Sheet

(51) Int. Cl.

| | | |
|---|---|---|
| *C09D 11/037* | (2014.01) | |
| *B44F 1/14* | (2006.01) | |
| *C09D 5/29* | (2006.01) | |
| *C09D 7/12* | (2006.01) | |
| *C09D 11/101* | (2014.01) | |
| *B05D 3/00* | (2006.01) | |
| *C09D 11/107* | (2014.01) | |
| *C09D 11/14* | (2006.01) | |
| *C09D 11/50* | (2014.01) | |
| *C08K 3/08* | (2006.01) | |

(52) U.S. Cl.
CPC ............. *C09D 5/29* (2013.01); *C09D 7/1266* (2013.01); *C09D 7/1275* (2013.01); *C09D 7/1291* (2013.01); *C09D 11/101* (2013.01); *C09D 11/107* (2013.01); *C09D 11/14* (2013.01); *C09D 11/50* (2013.01); *C08K 3/08* (2013.01); *C08K 2003/0806* (2013.01); *C08K 2201/016* (2013.01); *Y10T 156/10* (2015.01); *Y10T 428/24851* (2015.01); *Y10T 428/25* (2015.01); *Y10T 428/256* (2015.01)

(56) References Cited

U.S. PATENT DOCUMENTS

| | | | |
|---|---|---|---|
| 4,913,858 | A | 4/1990 | Miekka et al. |
| 5,164,227 | A | 11/1992 | Miekka et al. |
| 5,549,774 | A * | 8/1996 | Miekka .................. B41M 3/14 |
| | | | 156/209 |
| 8,015,919 | B2 | 9/2011 | Boswell et al. |
| 2004/0137334 | A1 | 7/2004 | Otaki et al. |
| 2007/0259182 | A1 | 11/2007 | Bujard et al. |
| 2008/0007852 | A1 | 1/2008 | Kawasaki |
| 2008/0295646 | A1 | 12/2008 | Mirkin et al. |
| 2009/0092904 | A1 | 4/2009 | Hayashida et al. |
| 2010/0090455 | A1* | 4/2010 | Boswell .................. B41F 11/02 |
| | | | 283/57 |
| 2010/0261827 | A1 | 10/2010 | Peri et al. |
| 2010/0307705 | A1 | 12/2010 | Rahm et al. |
| 2011/0239886 | A1* | 10/2011 | Holmes ................ B42D 25/405 |
| | | | 101/483 |
| 2012/0002255 | A1 | 1/2012 | Boswell et al. |
| 2012/0029121 | A1 | 2/2012 | Ormerod et al. |
| 2012/0199994 | A1 | 8/2012 | Richert et al. |

FOREIGN PATENT DOCUMENTS

| | | |
|---|---|---|
| JP | 2007-154292 A | 6/2007 |
| JP | 2008-203738 A | 9/2008 |
| JP | 2009-3032 A | 1/2009 |
| KR | 10-2009-0066704 A | 6/2009 |
| WO | 00/24946 | 5/2000 |
| WO | 02/094945 | 11/2002 |
| WO | 03/046245 | 6/2003 |
| WO | 2004/045755 | 6/2004 |
| WO | 2004/089813 | 10/2004 |
| WO | 2005/049745 | 6/2005 |
| WO | 2005/051675 | 6/2005 |
| WO | 2006/021528 | 3/2006 |
| WO | 2006/087138 A1 | 8/2006 |
| WO | 2006/099312 | 9/2006 |
| WO | 2007/057328 | 5/2007 |
| WO | 2007/103536 | 9/2007 |
| WO | 2008/061930 | 5/2008 |
| WO | 2009/000613 | 12/2008 |
| WO | 2009/056401 | 5/2009 |
| WO | 2010/108837 | 9/2010 |

OTHER PUBLICATIONS

International Search Report issued Jul. 19, 2011 in PCT/EP10/67898 fled Nov. 22, 2010.

European Search Report issued Apr. 29, 2010 in EP 09 17 7328 filed Nov. 27, 2009.

* cited by examiner

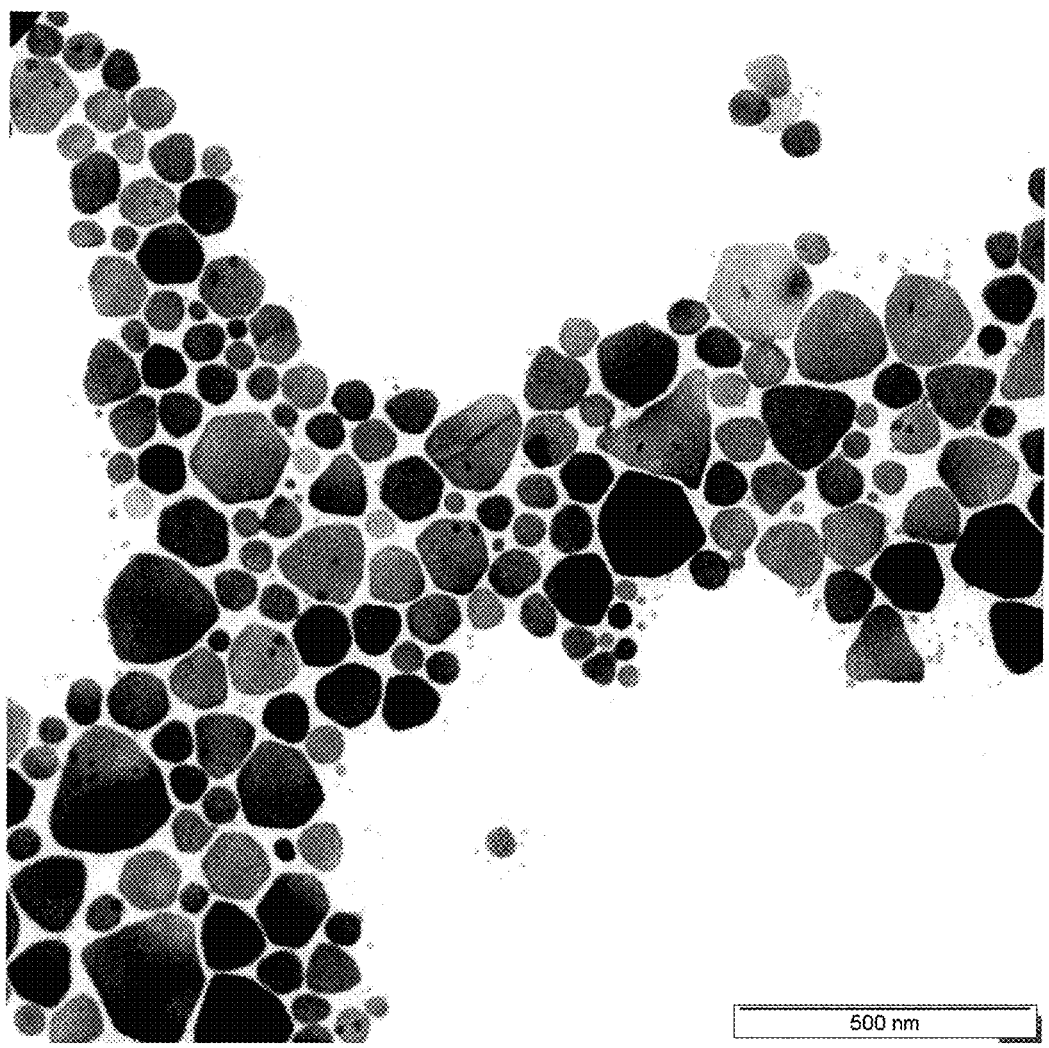

COATING COMPOSITIONS FOR SECURITY ELEMENTS AND HOLOGRAMS

CROSS REFERENCE TO RELATED APPLICATIONS

The present application is a continuation of U.S. patent application Ser. No. 13/511,582 (now U.S. Pat. No. 9,453,132), filed on Jun. 27, 2012, which is a 35 U.S.C. §371 national stage patent application of international patent application PCT/EP10/67898, filed Nov. 22, 2010, which claims priority to EP 09177328.3, filed Nov. 27, 2009.

The present invention relates to the use of coating compositions, comprising shaped transition metal, especially silver, particles and a binder, wherein the ratio of pigment to binder is preferably such that the resulting coating shows an angle dependent colour change, for the production of security elements and holograms. When the coating compositions of the present invention are used in coating a hologram the obtained products show a an angle dependent colour change (flip/flop effect), different colours in reflection and transmission, an extremely bright OVD image and extremely strong rainbow effect, high purity and contrast.

GB-A-1,465,908 (U.S. Pat. No. 4,116,710) relates to a method for the preparation of particulate metal, such as aluminium, which method comprises depositing a metal coating on a substrate by vapor, electroless or sputter deposition and removing the metal coating from the substrate by dissolving the substrate in a solvent therefor, the thickness of the deposited coating being such that upon dissolution of the substrate the metal is released as a plurality of metal particles. The metal platelets obtained by the process have a thickness of from 20 to 100 nm, especially 35 to 60 nm.

U.S. Pat. No. 4,321,087 discloses a continuous process for preparing finely divided metal particles comprising the steps of: (a) applying a release coating onto at least one side of a continuous carrier sheet in an amount of from 0.75 to 1.50 lbs. of said release coating per side of said carrier sheet, (b) depositing in the form of a thin film, a metal selected from the group consisting of aluminum, chromium, copper, steel, silver and gold, in an amount of from 35 to 45 nm thickness directly onto said release coating, (c) passing said carrier sheet with said release coating and said film of said metal through a solvent for solubilizing said release coating but which is non-reactive with said metal, (d) removing said film of said metal from said carrier sheet in a particulate form to produce the metal particles substantially free of said release coating, and collecting the metal particles in a non-reactive solvent which is non-reactive with said metal. (e) concentrating the metal particles, and (f) breaking the metal particles into pigment particles having a particle size diameter between about 25 and 50 microns.

WO0024946 discloses a process for making flakes comprising: providing a vapor deposition chamber; placing a transport device in the vapor deposition chamber; providing a release coat source and a vacuum deposition source in the vacuum deposition chamber directed toward the transport device, in which the deposition source deposits a layer of flake material; applying a vacuum to the chamber, and while the chamber is evacuated, applying-alternate layers of a release coat from the release coat source and a vapor deposited flake layer from the vacuum deposition source to the transport device in sequence to build up a multi-layer sandwich of alternating flake material layers and intervening release coat layers, the release coat layers comprising a dissolvable material that forms a smooth continuous barrier layer and support surface on which the flake material layers can be formed, so that removal of the sandwich from the evacuated chamber yields a multi-layer sandwich which can be easily separated into flakes of fine particle size by subsequent treatment with a material that essentially completely dissolves the intervening release coat layers to remove them from the flakes.

According to WO0024946 another process for making metal flakes is a process of Avery Dennison Corporation for making flakes sold under the designation Metalure®. In this process both sides of a polyester carrier are gravure coated with a solvent-based resin solution. The dried coated web is then transported to a metallizing facility where both sides of the coated sheet are metallized by a thin film of vapor deposited aluminum. The sheet with the thin metal film is then returned to the coating facility where both sides of the aluminum are coated with a second film of the solvent-based resin solution. The dried coated/metal sheet is then transported again to the metallizing facility to apply a second film of vapor deposited aluminum to both sides of the sheet. The resulting multi-layer sheet is then transported for further processing to a facility where the coatings are stripped from the carrier in a solvent such as acetone. The stripping operation breaks the continuous layer into particles contained in a slurry. The solvent dissolves the polymer out from between the metal layers in the slurry. The slurry is then subjected to sonic treatment and centrifuging to remove the solvent and the dissolved coating, leaving a cake of concentrated aluminum flakes approximately 65% solids. The cake is then let down in a suitable vehicle and further sized by homogenizing into flakes of controlled size for use in inks, paints, and coatings. Metal flakes produced by this process for use in printable applications such as inks are characterized by a particle size from about 4 to 12 microns and a thickness from about 150 to about 250 angstroms.

WO020090613 as well as WO03046245 discloses a process for the preparation of flakes having a high aspect ratio in which the flakes have an average particle size from about 4 to about 12 microns and a single layer thickness from about 5 to about 500 angstroms.

WO02/094945 relates to a method for the production of plane-parallel platelets, comprising the steps:

a) vapour-deposition, at a pressure below atmospheric pressure, of a separating agent onto a carrier to produce a separating agent layer, b) vapour-deposition, at a pressure below atmospheric pressure, of at least one product layer onto the separating agent layer, and c) dissolution of the separating agent layer in a solvent and production of a suspension in which the at least one product layer is present in the form of plane-parallel platelets, in which method the separating agent is selected from the group consisting of anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetra-phenylmethane, triphenylene, triphenylmethanol, and also mixtures of at least two of those substances. The planparall platelets obtained by said process have typically a thickness of 30 to 500 nm and a diameter of from 5 to 50 μm.

WO06/021528 relates to a process for the production of plane-parallel platelets, comprising the steps:

a) vapour-deposition of a separating agent onto a carrier to produce a separating agent layer, b) vapour-deposition of at least one product layer onto the separating agent layer, and c) dissolution of the separating agent layer in a solvent and production of a suspension in which the at least one product layer is present in the form of plane-parallel platelets, wherein the separating agent is selected from the group consisting of anthracene, anthraquinone, acetamidophenol, acetylsalicylic acid, camphoric anhydride, benzimidazole, benzene-1,2,4-ricarboxylic acid, biphenyl-2,2-dicarboxylic acid, bis(4-hydroxyphenyl)sulfone, dihydroxyan-thraquinone, hydantoin, 3-hydroxybenzoic acid, 8-hydroxyquinoline-5-sulfonic acid mono-hydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol, and also mixtures of at least two of those substances, especially pentaerythritol ($C(CH_2OH)_4$), tri-mesic acid (=1,3,5 bezene tricarboxylic acid), DL-alanine, DL-valine, 2,6-diaminopurine, ascorbic acid, 1,3,5-benzenetricarboxylic acid, o-acetylsalicyclic acid, diphenic acid, terephthalic acid, pyrogallol, cyanuric acid, hexamethyltetramine (urotropin), fumaric acid, and 4-acetylbenzoic acid and also mixtures of at least two of those substances.

WO07/057328 discloses a process for the production of plane-parallel platelets, comprising the steps:

a) deposition of a separating agent I, which is dissolvable in water, onto a carrier to produce a separating agent layer, b) vapour-deposition of a separating agent II, which is not dissolvable in water, onto the separating agent layer of step a), c) vapour-deposition of at least one product layer onto the separating agent layer of step b), and d) vapour-deposition of a separating agent II, which is not dissolvable in water, onto the product layer of step c), e) dissolution of the separating agent layer of step a) in water and production of a suspension in which the at least one product layer is present in the form of plane-parallel platelets, the top surface and the bottom surface, but not the side surfaces of which are covered by the separating agent II, and f) dissolution of the separating agent layer of steps b) and d) in a solvent and production of a suspension in which the product, comprising at least one layer, is present in the form of plane-parallel platelets.

The aluminium flakes described in WO06/021528 and WO07/057328 have an average diameter of at least 2 µm, especially from 2 to 20 µm, more especially from 3 to 15 µm, and most preferred from 5 to 15 µm. The thickness of the aluminium flakes is generally from 10 to 150 nm, especially from 10 to 100 nm, and more especially from 30 to 60 nm.

WO2005/051675 relates to a method for forming a (security) product comprising the steps of:

a) providing a sheet of base material, said sheet having an upper and lower surface;

b) depositing a metallic ink on at least a portion of the sheet of base material; and c) forming a diffraction grating on at least a portion of the metallic ink, wherein the optical density of metallic ink when deposited is in the range of 0.2 to 0.8.

The average pigment particle diameter is in the range 8-15 µm and the thickness of the pigment particles is in the range 10-50 nm, especially 19-21 nm.

WO2005/049745 discloses a coating composition for use in coating a diffraction grating, comprising metal pigment particles and a binder wherein the ratio of pigment to binder is sufficiently high as to permit the alignment of the pigment particles to the contours of the diffraction grating. Preferably, the thickness of the pigment particles is less than 50 nm. More preferably, the thickness of pigment particle is less than 35 nm. More preferably still, the thickness of pigment particle is less than 20 nm. Even more preferably still, the thickness of pigment particle is in the range 5-18 nm. In one embodiment of WO2005/049745, the thickness of the pigment particles is in the range 10-50 nm. In another embodiment, the thickness of pigment particle is in the range 10-30 nm. In another embodiment, the average thickness of pigment particle is 17 nm. In another embodiment, the average thickness of pigment particle is 12.5 nm.

The present invention provides coating compositions which can show an angle dependent colour change (variation of color as a function of the viewing angle; flip/flop effect) as well as different colours in reflection and transmission, and, when used in printing holograms, results in (security) products which can show an angle dependent colour change (flip/flop effect), different colours in reflection and transmission, an extremely bright OVD image and extremely strong rainbow effect, high purity and/or contrast.

The coating compositions comprise shaped transition metal particles (pigment) having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm and a binder, wherein the ratio of pigment to binder is such that the resulting coating shows an angle dependent colour change, i.e. a variation of color as a function of the viewing angle.

The layer formed from the shaped transition metal particles exhibits "color shifting", meaning that the layer exhibits a change in color as the layer is viewed at different angles. Said "color shifting" is caused solely by the shaped transition metal particles without the use of additional colorants.

The resulting coating shows an angle dependent colour change, if the ratio of binder to shaped transition metal particles (pigment) is below 10:1, especially below 5:1.

The transition metal is selected from the group consisting of Cu, Ag, Au, Zn, Cd, Ti, Cr, Mn, Fe, Co, Ni, Ru, Rh, Pd, Os, Ir and Pt. The transition metal is preferably Ag.

The shaped transition metal particles are typically in the form of nanoplatelets, trigonal and hexagonal nanoprisms, nanostars (branched particles), nanocubes, nanocrescents, nanodisks, nanowires, nanorods, nanohexagons, nanospheroids, nanocylinders, pyramids, various nanopolyhedra or hollow structures, or they are nanolens-shaped or nanocone-shaped, i.e. they differ from regular spheres.

The longest dimension of the edge length of the shaped transition metal particles may vary of from about 15 nm to about 1000 nm, preferably from 15 nm to 600 nm. The thickness of the shaped particles may vary of from about 2 to about 100 nm, preferably from 2 to 30 nm.

Preferably, the shaped transition metal particles are in the form of platelets having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm. More preferred, some of the shaped particles are in the form of trigonal and/or hexagonal prisms. Especially, the shaped particles may be obtained as a mixture of platelets of different shapes in which hexagonal and/or triangular and/or truncated triangular prisms make up more than 20%, preferably more than 30% and in particular more than 50% of the total number of shaped transition metal particles. The shaped particles are advantageously monocrystalline.

The aspect ratio (longest dimension of edge length/thickness is at least 1.5, especially in the range of 1.5 to 300, very especially in the range of 1.5 to 125.

It is widely known to use in banknotes security elements in the form of strips or threads. Printing the inks (offset, gravure, flexo, ink jet, screen or intaglio inks) of the present inventiondirectly on paper, or other substrates results in a coating showing an angle dependent colour change. This direct printing could replace the security elements in the form of strips or threads used in banknotes, which are made from a transparent film provided with a continuous reflective metal layer, vacuum deposited aluminium on polyester film being the commonest example.

The effects obtainable by the coating compositions of the present invention are described on basis of coating compositions, comprising shaped silver particles, but are not limited thereto:

The colours in transmission and reflection are dependant on the light-absorption spectrum of the coating and the colour in reflection may be complementary to the colour in transmission in the physical sense. Generally, particles with higher aspect ratio and/or larger linear dimensions provide blue colour in transmission and, depending on pigment to binder ratio, silver, gold, bronze, copper or violet colour in reflection. Particles with lower aspect ratio and/or smaller linear dimensions provide violet, magenta, pink, green or brown colour in transmission and, depending on pigment to binder ratio, various colours in reflection. For example, a blue colour is provided with silver particles obtained according to Examples 1 (aspect ratio of about 6-7) and 2 (aspect ratio above 10).

The coating compositions comprise the shaped transition metal particles and a binder. The binder is a high-molecular-weight organic compound conventionally used in coating compositions. The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

Advantageously, the coating composition further comprises a solvent.

The binder may comprise any one or more selected from the group comprising nitrocellulose, ethyl cellulose, cellulose acetate, cellulose acetate propionate (CAP), cellulose acetate butyrate (CAB), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester and rosin ester resins.

An angle dependent colour change can be obtained at a pigment/binder ratio of about 10:1 to about 1:10, whereas a pigment/binder ratio of >10:1 results in silver coloured coatings and a pigment/binder ratio of <1:10 results in the loss of visible reflection.

The coating composition is preferably a printing ink. The ink according to the present invention comprises, as in the case of an ordinary printing ink, the shaped transition metal particles, a binder, an auxiliary agent, and the like.

With respect to the binder resin, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly(vinyl butyral) (PVB), poly(vinyl alcohol) (PVA), poly(vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PM MA), MMA-styrene copolymer], polycarbonate (PC), celluloses [ethyl cellulose (EC),cellulose acetate (CA), propyl cellulose (CP), cellulose acetate butyrate (CAB), cellulose nitrate (CN)], fluorin based polymers [polychlorofluoroethylene (PCTFE), poly-tetrafluoroethylene (PTFE), tetrafluoroethylene-hexafluoro-ethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

Furthermore, to the binder, a plasticizer for stabilizing the flexibility and strength of the print film and a solvent for adjusting the viscosity and drying property thereof may be added according to the needs therefor. The solvent may comprise any one or more of an ester, such as n-propyl acetate, iso-propyl acetate, ethyl acetate, butyl acetate; an alcohol, such as ethyl alcohol, industrial methylated spirits, isopropyl alcohol or normal propyl alcohol; a ketone, such as methyl ethyl ketone or acetone; an aromatic hydrocarbon, such as xylene and toluene. A solvent of a low boiling temperature of about 100° C. and a petroleum solvent of a high boiling temperature of 250° C. or higher, may be used according to the type of the printing method. An alkylbenzene or the like, for example may be used as a solvent of a low boiling temperature. Examples of solvents are ethoxypropanol, methylethylketon, methoxypropylacetate, diacetonalcohol etc.

Further in addition, an auxiliary agent including a variety of reactive agents for improving drying property, viscosity, and dispersibility, may suitably be added. The auxiliary agents are to adjust the performance of the ink, and for example, a compound that improves the abrasion resistance of the ink surface and a drying agent that accelerates the drying of the ink, and the like may be employed.

A photopolymerization-curable resin or an electron beam curable resin wherein a solvent is not used may also be employed as a binder resin that is a principal component of the vehicle. The examples thereof include an acrylic resin, and specific examples of acrylic monomers commercially available are shown below.

A monofunctional acrylate monomer that may be used includes for example, 2-ethylhexyl acrylate, 2-ethylhexyl-EO adduct acrylate, ethoxydiethylene glycol acrylate, 2-hydroxyethyl acrylate, 2-hydroxypropyl acrylate, 2-hydroxyethyl acrylate-caprolactone addduct, 2-phenoxyethyl acrylate, phenoxydiethylene glycol acrylate, nonyl phenol-EO adduct acrylate, (nonyl phenol-EO adduct)-caprolactone adduct acrylate, 2-hydroxy-3-phenoxypropyl acrylate, tetrahydrofurfuryl acrylate, furfuryl alcohol-caprolactone adduct acrylate, acryloyl morpholine, dicyclopentenyl acrylate, dicyclopentanyl acrylate, dicyclopentenyloxyethyl acrylate, isobornyl acrylate, (4,4-dimethyl-1,3-dioxane)-caprolactone adduct acrylate, (3-methyl-5,5-dimethyl-1,3-dioxane)-caprolactone adduct acrylate, and the like.

A polyfunctional acrylate monomer that may be used includes hexanediol diacrylate, neo-pentyl glycol diacrylate, polyethylene glycol diacrylate, tripropylene glycol diacrylate, neo-pentyl glycol hydroxypivalate diacrylate, (neopentyl glycol hydroxypivalate)-caprolactone adduct diacrylate, (1,6-hexanediol diglycidyl ether)-acrylic acid adduct, (hydroxypivalalde-hyde-trimethylolpropane acetal) diacrylate, 2,2-bis[4-(acryloyloxydiethoxy)phenyl]propane, 2,2-bis[4-(acryloyloxydiethoxy)phenyl]methane, hydrogenated bisphenol A-ethylene oxide adduct diacrylate, tricyclodecanedimethanol diacrylate, trimethylolpropane triacrylate, pentaerithritol triacrylate, (trimethylolpropane-propylene oxide) adduct triacrylate, glycerine-propylene oxide adduct triacrylate, a mixture of dipentaerithritol hexaacrylate and pentaacrylate, esters of dipentaerithritol and lower fatty acid and acrylic acid, dipentaerithritol-caprolactone adduct acrylate, tris(acryloyloxyethyl) isocyanurate, 2-acryloyloxyethyl phosphate, and the like.

Inks comprising the above resins are free of solvent and are so constituted as to polymerize in chain reaction upon irradiation by an electron beam or electromagnetic waves.

With respect to inks of ultraviolet-irradiation type among these inks, a photopolymerization initiator, and depending on the needs therefor, a sensitizing agent, and auxiliary agents such as a polymerization inhibitor and a chain transfer agent, and the like may be added thereto.

With respect to photo-polymerization initiators, there are, (1) an initiator of direct photolysis type including an arylalkyl ketone, an oxime ketone, an acylphosphine oxide, or the like, (2) an initiator of radical polymerization reaction type including a benzophenone derivative, a thioxanthone derivative, or the like, (3) an initiator of cationic polymerization reaction type including an aryl diazonium salt, an aryl iodinium salt, an aryl sulfonium salt, and an aryl acetophenone salt, or the like, and in addition, (4) an initiator of energy transfer type, (5) an initiator of photoredox type, (6) an initiator of electron transfer type, and the like. With respect to the inks of electron beam-curable type, a photopolymerization initiator is not necessary and a resin of the same type as in the case of the ultraviolet-irradiation type inks can be used, and various kinds of auxiliary agent may be added thereto according to the needs therefor.

The inks comprise a total content of shaped transition metal particles of from 0.1 to 90% by weight, preferably 0.1-70% by weight based on the total weight of the ink.

Preferably, the binder comprises 50% nitrocellulose in conjunction with any above mentioned resin.

The composition may additionally comprise a solvent. The solvent may be ester/alcohol blends and preferably normal propyl acetate and ethanol. More preferably, the ester/alcohol blend is in a ratio of between 10:1 and 40:1, even more preferably 20:1 to 30:1.

The solvent used in the metallic ink may comprise any one or more of an ester, such as n-propyl acetate, iso-propyl acetate, ethyl acetate, butyl acetate; an alcohol, such as ethyl alcohol, industrial methylated spirits, isopropyl alcohol or normal propyl alcohol; a ketone, such as methyl ethyl ketone or acetone; an aromatic hydrocarbon, such as toluene, and water.

Preferably, the composition is used in the manufacture of a hologram. Reference is made to WO2005/051675 and WO2008/061930. The method described therein for forming an optically variable image (an optically variable device) on a substrate comprises the steps of:

a) forming an optically variable image (OVI) on a discrete portion of the substrate; and b) depositing a coating composition, especially a metallic ink, comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm and a binder on at least a portion of the OVI.

Preferably, step a) comprises a1) applying a curable compound to at least a portion of the substrate;

a2) contacting at least a portion of the curable compound with OVI forming means; and a3) curing the curable compound.

Referring to FIG. 1 of WO08/061930, paper, aluminium, or another opaque substrates (1) is printed with an ultra violet curable lacquer (2) on its lower surface. An optically variable device or other lens or engraved structure is cast (3) into the surface of the lacquer (2) with a clear shim (4) having the optically variable device or other lens or engraved structure thereon. The optically variable device or other lens or engraved structure image is imparted into the lacquer and instantly cured (6) via an UV lamp disposed through the shim (4) at normal processing speeds through polarizing lens (8), quartz roller (6), and clear polycarbonate roller (5). The optically variable device or other lens or engraved structure image is a facsimile of the image on the clear shim. Metallic ink (9) is printed (10) over the optically variable device or other lens or engraved structure and causes the optically variable device or other lens or engraved structure to become light reflective. Further colours (11) can be subsequently conventionally printed in-line at normal printing process speeds. In an alternative embodiment, the paper, aluminium, and all manner of other opaque substrate (1) is replaced with a filmic substrate. Such material is substantially transparent and therefore the image is visible from both sides of the surface.

The (security) product obtainable by using the above method is new and forms a further subject of the present application.

In said embodiment (security) product comprises a substrate, an UV cured lacquer, holo-graphic or other sub-microscopic diffraction gratings engraved into the UV cured lacquer and a metallic coating on the engraved UV cured lacquer on at least portion of the substrate.

Referring to FIG. 12 of WO08/061930 a film substrate 100, UV cured lacquer 102 and holographic or other sub-microscopic diffraction grating 104 with metallic ink 106 printed over with both first 108 and second surfaces 110 viewable.

Referring to FIG. 13 of WO08/061930 a paper substrate 120, UV cured lacquer 122 and holographic or other sub-microscopic diffraction grating 124 with metallic ink 126 printed over with the image viewable through the first surface 128 only.

In a further preferred embodiment of the present invention a coloured, or metallic ink is deposited on a substrate, on which the optically variable image is formed; before forming the optically variable image on at least a portion of the coloured, or metallic ink.

The substrate may comprise any sheet material. The substrate may be opaque, substantially transparent or translucent, wherein the method described in WO08/061930 is especially suited for substrates, which are opaque to UV light (non-transparent). The substrate may comprise paper, leather, fabric such as silk, cotton, tyvac, filmic material or metal, such as aluminium. The substrate may be in the form of one or more sheets or a web. The substrate may be mould made, woven, non-woven, cast, calendared, blown, extruded and/or biaxially extruded. The substrate may comprise paper, fabric, man made fibres and polymeric compounds. The substrate may comprise any one or more selected from the group comprising paper, papers made from wood pulp or cotton or synthetic wood free fibres and board. The paper/board may be coated, calendared or machine glazed; coated, uncoated, mould made with cotton or denim content, Tyvac, linen, cotton, silk, leather, polythyleneterephthalate, polypropylene propafilm, polyvinylchloride, rigid PVC, cellulose, tri-acetate, acetate polystyrene, polyethylene, nylon, acrylic and polytherimide board. The polythyleneterephthalate substrate may be Melienex type film orientated polypropylene (obtainable from DuPont Films Willimington Delaware product ID Melinex HS-2).

The substrates being transparent filmic or non transparent substrates like opaque plastic, paper including but not limited to banknote, voucher, passport, and any other security or fiduciary documents, self adhesive stamp and excise seals, card, tobacco, pharmaceutical, computer software packaging and certificates of authentication, aluminium, and the like.

In a preferred embodiment of the present invention the substrate is a non-transparent (opaque) sheet material, such as, for example, paper. In another preferred embodiment of the present invention the substrate is a transparent sheet material, such as, for example, polytheyleneterephthalate.

The forming of an optically variable image on the substrate may comprise depositing a curable compound, or composition on at least a portion of the substrate. The composition, generally a coating or lacquer may be deposited by means of gravure, flexographic, ink jet and screen process printing. The curable lacquer may be cured by actinic radiations, preferably ultraviolet (U.V.) light or electron beam. Preferably, the lacquer is UV cured. UV curing lacquers can be obtained from BASF SE. The lacquers exposed to actinic radiations or electron beam used in the present invention are required to reach a solidified stage when they separate again from the imaging shim in order to keep the record in their upper layer of the sub-microscopic, holographic diffraction grating image or pattern (OVI). Particularly suitable for the lacquers compositions are chemistries used in the radiation curable industries in industrial coatings and graphic arts. Particularly suitable are compositions containing one or several photo-latent catalysts that will initiate polymerization of the exposed lacquer layer to actinic radiations. Particularly suitable for fast curing and conversion to a solid state are compositions comprising one or several monomers and oligomers sensitive to free-radical polymerization, such as acrylates, methacrylates or monomers or/and oligomers, containing at least one ethylenically unsaturated group. Reference is made to pages 8 to 35 of WO2008/061930.

The UV lacquer may comprise an epoxy-acrylate from the CRAYNOR® Sartomer Europe range (10 to 60%) and one or several acrylates (monofunctional and multifunctional), monomers which are available from Sartomer Europe (20 to 90%) and one, or several photoinitiators (1 to 15%) such as Darocure® 1173 and a levelling agent such as BYK®361 (0.01 to 1%) from BYK Chemie.

The curable composition is preferably deposited by means of gravure or flexographic printtng.

The curable composition is preferably curable by means of an ultraviolet (U.V.) light or an electron beam. The curable composition can be coloured.

The metallic ink may be applied to the substrate by means of conventional printing press such as gravure, rotogravure, flexographic, lithographic, offset, letterpress intaglio and/or screen process, or other printing process.

In order that the hologram is clearly visible on both the first and second surface of a clear filmic substrate and the first surface of a paper substrate, preferably, the metallic pigment particles are printed in such a way as to align themselves such that they follow and conform to the contours of the diffraction grating.

To accomplish this alignment of metal pigment particles to the contours of the diffraction grating the ink (coating composition) preferably has a very low binder, a low pigment content and a medium pigment to binder ratio and/or very thin pigment particles.

A filmic substrate is printed conventionally with a number of coloured inks, using, for example, a Cerutti R950 printer (available from Cerrutti UK Long Hanborough Oxon.). The substrate is then printed with an ultra violet curable lacquer. An OVI is cast into the surface of the curable composition with a shim having the OVI thereon, the holographic image is imparted into the lacquer and instantly cured via a UV lamp, becoming a facsimile of the OVI disposed on the shim. A metallic ink is printed over the OVI and causes the OVI to become light reflective, the OVI is visible on the first surface of a paper or other non-filmic substrate and both sides of the filmic substrate. In another embodiment, the UV curable composition is replaced with an electronic beam curable composition and the UV lamp replaced with an electron beam emitting device.

The ink preferably comprises low solids, high viscosity binders. Preferably, the pigment to binder ratio is in the range of 10:1 to 1:10 by weight. More preferably, the pigment to binder ratio is by weight in the range of 6:1 to 1:6, and even more preferably 4:1 to 1:4. Most preferably the pigment to binder ratio is from 3:1 to 1:3.

The metal pigment content by weight of the composition may be less than 90%. Preferably the pigment content by weight of the composition is less than 70%, more preferably in the range of 0.1% to 90%, even more preferably in the range 0.1% to 70%.

The binder may comprise any one or more selected from the group comprising nitro cellulose, vinyl chloride, vinyl acetate copolymers, vinyl, acrylic, urethane, polyethyleneterephthalate, terpene phenol, polyolefin, silicone, cellulose, polyamide, polyester, rosin ester resins. The preferred binder is 50% nitrocellulose (ID nitrocellulose DHL120/170 and nitrocellulose DLX30/50 supplied by Nobel Industries) 50% polyurethane (ID Neorez 0335 supplied by Avecia). The solvents may be ester/alcohol blends and preferably normal propyl acetate and ethanol in a ratio of 20:1 to 30:1.

The compositions of the present invention can be applied to holograms for use on substrates such as (security products), including banknotes, credit cards, identification documents like passports, identification cards, drivers licenses, or other verification documents, pharmaceutical apparel, software, compact discs, tobacco packaging and other products or packaging prone to counterfeiting or forgery, to protect them from fraudulent conversion, diversion or imitation.

Preferably, when the substrate carrying the metallised image or pattern is subsequently over-laid onto printed pictures and/or text, or the substrate is pre-printed with pictures and/or text and the metallised image or pattern is deposited thereon those pre-printed features are visible through the substrate and/or the metallic composition coated diffraction grating or image.

The coating compositions may be deposited on a diffraction grating disposed on a substrate such as a substantially transparent, translucent, or opaque substrate. The substrate may comprise paper, filmic material or metal, such as aluminium.

The substrate may comprise polymeric compounds. The substrate may comprise papers made from wood pulp or cotton or synthetic wood-free fibres.

The diffraction grating may be formed using any methods known to the skilled man such as those described in U.S. Pat. Nos. 4,913,858, 5,164,227, WO2005/051675 and WO2008/061930.

The coating composition may be applied to the substrate by means of conventional printing press such as gravure, rotogravure, flexographic, lithographic, offset, letterpress intaglio and/or screen process, or other printing process.

Preferably, when the substrate carrying the enhanced diffractive image or pattern is subsequently over-laid onto printed pictures and/or text, or the substrate is pre-printed with pictures and/or text and the enhanced diffractive image or pattern is deposited thereon, those printed features are visible through the substrate and/or the metallic ink coated diffraction grating or image.

By varying the film-weight and density of the deposited metallic ink, the transmission of light through the enhanced image can be adjusted to provide a desirable range of visual effects.

The composition may further comprise modifying additives, for example colorants and/or suitable solvent (s).

Preferably, the resin maintains adhesion of the composition to the surface of the diffraction grating.

Specific additives can be added to the composition to modify its chemicals and/or physical properties. Polychromatic effects can be achieved by the introduction of (colored) inorganic and/or organic pigments and/or solvent soluble dyestuffs into the ink, to achieve a range of coloured shades. By addition of a dye the transmission colour can be influenced. By the addition of fluorescent, or phosphorescent materials the transmission and/or the reflection colour can be influenced.

Suitable colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoiso-indolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, the 2,9-dichloro-quinacridone in platelet form described in WO08/055807, or a mixture or solid solution thereof.

Plateletlike organic pigments, such as plateletlike quinacridones, phthalocyanine, fluororubine, dioxazines, red perylenes or diketopyrrolopyrroles can advantageously be used.

Suitable colored pigments also include conventional inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black and mixed metal oxides.

Examples of dyes, which can be used to color the curable composition, are selected from the group consisting of azo, azomethine, methine, anthraquinone, phthalocyanine, dioxazine, flavanthrone, indanthrone, anthrapyrimidine and metal complex dyes. Monoazo dyes, cobalt complex dyes, chrome complex dyes, anthraquinone dyes and copper phthalocyanine dyes are preferred.

It is possible to generate striking colour effects by combining shaped, especially platelet-like and spherical silver particles having a diameter in the range of from 3 to 40 nm. Reference is made to Example 7 of the present application.

Hence, in a preferred embodiment of the present invention the coating composition comprises besides platelet-like transition metall (silver) particles spherical transition metall (silver) particles having a diameter in the range of from 3 to 40 nm, wherein up to 40% of the transition metal (silver) particles can be spherical.

The binder resins may be initially dissolved in the appropriate solvent(s) to form liquid varnishes. These varnishes can then be blended together with the metallic pigment and/or other components by means of a high-speed blender to produce the composition.

In accordance with a further aspect of the present invention, there is provided a metallic ink comprising shaped transition metal particles (pigment) and a binder. The ratio of pigment to binder is sufficiently high as to permit the alignment of the metal particles to the contours of a diffraction grating.

The shaped transition metal particles may be prepared by any means known to the skilled man. For example, US2008/0295646 describes a thermal method of preparing metal, in particular silver nanoprisms having a unimodal size distribution and a predetermined thickness in the form of a colloidal suspension. A photochemical method of preparing silver nanoprisms of controlled edge length through wavelength modulation is described in WO2004/089813. WO2006/099312 describes the synthesis of gold nanoprisms. Silica-coated silver prisms which can be dispersed in a variety of organic solvents are described in C. Xue et al., Adv. Mater. 19, 2007, 4071.

WO2009056401 describes nano-shaped transition metal particles, in particular nanoplatelets, characterized by a surface plasmon resonance in the near infrared (NIR) range and their preparation. These particles are used as IR absorbers in heat shielding architectural, automotive glazing or agricultural films, laser welding, laser printing, security printing and near infrared curing of coatings.

The shaped transition metal particles may be prepared by any means known to the person skilled in the art. Reference is, for example, made to WO2010/108837. The method of manufacturing shaped transition metal particles, selected from the group consisting of Cu, Ag, Au, Zn, Cd, Ti, Cr, Mn, Fe, Co, Ni, Ru, Rh, Pd, Os, Ir and Pt, comprises the steps of first a) generating isotropic spherical metal nanoparticles by mixing a solution of reducing agent with an aqueous mixture comprising a transition metal salt in a concentration of higher than 2 mmol per liter and a polymeric dispersant and/or capping agent, and b) inducing controlled agglomeration of said isotropic nanoparticles by treatment with a peroxide, leading to formation of platelet-shaped metallic nano- or micro-particles.

The transition metal is preferably Ag, Cu, Pd or Au, more preferably Ag. The shaped particles may also be made from two of the above-mentioned transition metals to form core-shell or alloy type particles, for example as described in WO07103536.

Suitable examples of silver salts of mono-, di-, tri- or polycarboxylic acids include silver salts of acetic acid, propionic acid, 4-cyclohexyl butyric acid, oxalic acid, malonic acid, succinic acid, malic acid, maleic acid, fumaric acid, glutaric acid, adipic acid, citric acid and polyacrylic acid.

Suitable examples of silver salts of sulfonic or polysulfonic acids include silver salts of methane sulfonic acid, trifluormethane sulfonic acid, vinyl sulfonic acid, benzene sulfonic acid, toluene sulfonic acid, styrene sulfonic acid and sulfonated polystyrene.

Suitable examples of silver salts of P-containing acids include silver salts of phosphoric acid, metaphosphoric acid, phosphorous acid, pyrophosphoric acid, hypophosphoric acid and organo-substituted derivatives thereof, phenol-phosphate resins, polyacrylic phosphates and phosphonates.

Preferred silver(I) salts are $AgNO_3$, $Ag_2O$, $AgClO_4$, $Ag_2SO_4$, $CH_3CO_2Ag$, mono-, di- or trisilver citrate, $CH_3SO_3Ag$, $CF_3SO_3Ag$, wherein $AgNO_3$, $CH_3CO_2Ag$ and $Ag_2O$ are more preferred.

Examples of suitable gold salts are $KAu(CN)_2$; AuI; AuBr; AuCl; $R^1CO_2Au$, wherein $R^1$ has the same meaning, as described for $R^1CO_2Ag$; $HAuCl_4$; $AuBr_3$; $AuBr_4K$; $AuBr_4Na$; $AuCl_3$; $AuCl_4K$; $AuCl_4Li$; $AuCl_4Na$ and mixtures thereof, wherein $HAuCl_4$ is preferred.

Examples of suitable copper salts are $Cu(NO_3)_2$; $KCu(CN)_2$; copper(II)acetylacetonate; $Cu(R^1CO_2)_2$, wherein $R^1$ has the same meaning, as described for $R^1CO_2Ag$; $Cu(ClO_4)_2$; CuBr, $CuBr_2$, CuCl, $CuCl_2$, CuI, $CuSO_4$ and mixtures thereof.

The dispersant may be any polymer which prevents agglomeration or aggregation of the spherical and shaped particles. The dispersant may be a non-ionic, anionic or cationic polymer having a weight average molecular weight of from 500 to 2,000,000 g/mol, preferably from 1500 to 1,000,000, which forms a solution or emulsion in the aqueous mixture. Typically, the polymers may contain polar groups. Suitable polymeric dispersants often possess a two-component structure comprising a polymeric chain and an anchoring group. The particular combination of these leads to their effectiveness.

Suitable commercially available polymeric dispersants are, for example, EFKA® 4046, 4047, 4060, 4300, 4330, 4580, 4585, 8512, Disperbyk® 161, 162, 163, 164, 165, 166, 168, 169, 170, 2000, 2001, 2050, 2090, 2091, 2095, 2096, 2105, 2150, Ajinomoto Fine Techno's PB® 711, 821, 822, 823, 824, 827, Lubrizol's Solsperse® 24000, 31845, 32500, 32550, 32600, 33500, 34750, 36000, 36600, 37500, 39000, 41090, 44000, 53095, ALBRITECT® CP30 (a copolymer of acrylic acid and acrylphosphonate) and combinations thereof.

Preference is given to polymers derived from hydroxyalkyl(meth)acrylates and/or polyglycol (meth)acrylates, such as hydroxyethyl and hydroxypropyl (meth)acrylate, polyethylene glycol (meth)acrylates, (meth)acrylates having amine functionality, for example, N-[3-(dimethylamino)propyl](meth)acrylamide or 2-(N,N-dimethylamino)ethyl (meth)acrylate.

In particular, non-ionic copolymer dispersants having amine functionality are preferred. Such dispersants are commercially available, for example as EFKA® 4300, EFKA® 4580 or EFKA 4585.

The polymeric dispersants may be used alone or in admixture of two or more.

Suitable reducing agents may be selected from the group consisting of boranes and complexes thereof, metal boranates, hydrides, aluminates, aldehydes, carboxylic acids, hydrazines, hydrosulfites, stannanes, stannates, silanes, phosphines, phosphites and siloxanes.

Preference is given to sodium borohydride, borane complexes with sulfides and amines, hydrazine and ascorbic acid.

Examples of suitable peroxides are selected from the group consisting of $H_2O_2$, $C_1$-$C_8$alkyl peroxyacids, e.g. peracetic acid, acetyl cyclohexane sulfonyl peroxide, diisopropyl peroxy-dicarbonate, tent-amyl perneodecanoate, tert-butyl perneodecanoate, tert-butyl perpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinic acid peroxide, diacetyl peroxide, dibenzoyl peroxide, tert-butyl per-2-ethylhexanoate, bis(4-chlorobenzoyl)-peroxide, tert-butyl perisobutyrate, tert-butyl permaleinate, 1,1-bis(tert-butylperoxy)3,5,5-trimethylcyclohexane, 1,1-bis(tert-butylperoxy)cyclohexane, tert-butyl peroxy isopropylcarbonate, tert-butyl perisononaoate, 2,5-dimethylhexane 2,5-dibenzoate, tert-butyl peracetate, tent-amyl perbenzoate, ted-butyl perbenzoate, 2,2-bis(tert-butylperoxy)butane, 2,2 bis(tert-butylperoxy) propane, dicumyl peroxide, 2,5-dimethylhexane-2,5-di-tert-butylperoxide, 3-tert-butylperoxy 3-phenylphthalide, di-tert-amyl peroxide, α,α'-bis(tert-butylperoxyisopropyl)benzene, 3,5-bis (t-butylperoxy)3,5-dimethyl 1,2-dioxolane, di-tert-butylperoxide, 2,5-dimethylhexyne-2,5-di-tert-butylperoxide and 3,3,6,6,9,9-hexamethyl-1,2,4,5-tetraoxacyclononane, wherein $H_2O_2$ is preferred.

Optionally, the mixture of step a) of the present invention contains a capping agent. If present, the capping agent is typically used in a concentration up to 1 M, preferably from 0.001 to 100 mM.

Examples of suitable capping agents include mono- and polycarboxylic acids (e.g. citric acid, ethylenediamine tetraacetic acid, propionic acid) and salts thereof (e.g. sodium citrate, sodium salts of ethylenediamine tetraacetic acid, sodium propionate), sulphur-containing compounds, such as thiols (e.g. mercaptoethanol, dithiothreitol, mercaptopolyethyleneglycol), linear and cyclic disulfides (e.g. cystamine, mercaptoethanol disulfide, cyclodithiothreitol), xanthates (e.g. sodium ethylxanthogenate), dithiocarbamates (e.g. diethylammonium salt of diethyldithiocarbamic acid) and the like, amines (e.g. ammonia, aminoethanol, methylamine) and aminocarboxylic acids (e.g. aminoacetic acid, 2-aminopropionic acid, 3-aminopropionic acid).

The process of platelet-shaped particles manufacture is preferably carried out by dissolving or dispersing the transition metal salt in water in concentration of >0.2% by weight in the presence of a dispersant and optionally at least one of abovementioned water-soluble capping agents and dissolving or dispersing the reducing agent and optionally at least one of abovementioned water-soluble capping agents in water. The resulting solutions or dispersions are held at a temperature of less than 20° C., preferably they are cooled down to 5° C. or less, e.g. about 0 to 5° C. These two solutions are mixed either by addition of one solution to another, or, preferably, they are mixed by pumping both solutions into a mixing chamber, said chamber having additional outlet to collect the resulting dispersion of spherical nanoparticles. The simplest example of such a mixing chamber is a three-way connector of any shape. Upon completion of the metal salt reduction, the >20% by weight solution of hydrogen peroxide in water is slowly added to the dispersion of spherical metal nanoparticles with stirring until the desired spectral profile of reaction mixture is achieved. The step of peroxide addition may be performed at a temperature of from about 0° C. to about 100° C. Preferably, the peroxide is added at a temperature of from 20 to 70° C., more preferably from 30 to 60° C. The as prepared platelet-shaped metal particles are isolated by any means, known to a person skilled in the art, e.g. reversible agglomeration using appropriate surface-modifying agents and/or by centrifugation and/or by extraction with organic solvent.

The shaped particles may show NIR absorption, which characteristic might represent an additional security feature.

The coating composition, especially metallic ink of the present invention can also be used in the production of a hot stamping foil.

Accordingly, the present invention is also directed to a method of producing a hot stamping foil comprising the steps of:

(a) coating a carrier with a release coating, (b) applying a coating of a hard lacquer onto the release coating, (c) applying an ultraviolet primer coating onto the coating of the hard lacquer, (d) contacting at least a portion of the ultraviolet primer coating with optically variable image (optically variable device) forming means;

(e) depositing a coating composition comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm and a binder, especially a printing ink to the UV primer holding the transferred optically variable device either as a whole or in partial areas, (f) optionally printing subsequently process colours, and (g) applying a heat activated adhesive onto the layer obtained in step e), or f).

Examples of the release compound are silica, microcrystalline wax, rice wax, oricuri wax, stearic acid esters, polyglycols, and metallic salts of fatty acids.

Examples of the coating of the hard lacquer are polymethylmethacrylate, styrene acrylonitrile, polyethyleneterephthalate, nitrocellulose, or mixtures thereof. The coating of the hard lacquer affixed to said release coating has in general a thickness in the range 0.25 microns to 9 microns and has a glass transition temperature of at least 70 ° C.

Examples of the adhesive compound are vinyl alcohol, polyacrylates, polyalkacrylates, vinyl resins, polyvinyl acetate, cellulose resins, polyacrylamides, and ethylene/vinyl acetate copolymers.

Under the present invention a carrier film substrate having the thickness on the order of 12 microns to 75 microns and formed of a suitable plastic material such as a polyester, oriented polypropylene or other suitable material is coated with a release coating such as a microcrystalline wax or a partially saponified montan wax or other wax based coatings having a thickness in the range of 0.025 microns to 5 microns and then has a coating of hard lacquer applied over the release coating in a thickness in the range of 0.25 microns to 10 microns. The hard lacquer coating may be applied by a gravure roller following which is dried an ultraviolet primer coating having the thickness in a range of 0.3 microns to 9 microns is then applied by means of a gravure roller. An optically variable device is contacted by the embossing shim having an optically variable device thereon and is transferred into the surface of the UV lacquer and cured by UV light. A layer of the vacuum metallic ink is applied to the UV primer holding the transferred optically variable device either as a whole or in partial areas. Subsequent process colours can be gravure printed.

The hot stamping foil obtained in the above process can be used to label an article of manufacture. The method of labeling the article of manufacture comprises the steps of: contacting the heat activated adhesive layer of the hot stamping foil obtained according to the above process with said article; hot stamping said hot stamping foil to cause said heat activated adhesive layer to adhere to said article; and removing the carrier of said hot stamping foil from said hard lacquer layer.

The optically variable device (OVD) is, for example, an diffractive optical variable image (DOVI). The term "diffractive optical variable image" as used herein may refer to any type of holograms including, for example, but not limited to a multiple plane hologram (e.g., 2-dimensional hologram, 3-dimensional hologram, etc.), a stereogram, and a grating image (e.g., dot-matrix, pixelgram, exelgram, kinegram, etc.).

Examples of an optically variable image or device are holograms or diffraction gratings, moire grating, etc. These optical microstructured images are composed of a series of structured surfaces. These surfaces may have straight or curved profiles, with constant or random spacing, and may even vary from microns to millimetres in dimension. Patterns may be circular, linear, or have no uniform pattern. For example a Fresnel lens has a microstructured surface on one side and a pano surface on the other. The microstructured surface consists of a series of grooves with changing slope angles as the distance from the optical axis increases. The draft facets located between the slope facets usually do not affect the optical performance of the Fresnel lens.

Another aspect of the present invention is directed to a decorative, or security element, especially a security element which displays a more evident visual colour change and which can easily be checked by the "man on the street".

Accordingly, the present invention relates to a security element, especially for a document of value, right, identity, for a security label or a branded good, comprising a substrate, which may contain indicia or other visible features in or on its surface, and on at least part of the said substrate surface, a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

Preferably, the coating shows an angle dependent colour change. The colour change is a "simple message of authenticity", which can be checked by the unaided human eye.

At least part of a substrate is coated with a layer, comprising the platelet shaped transition metal particles. The coating comprising the platelet shaped transition metal particles can have a form. The form may be, for example, a symbol, a stripe, a geometric form, a fancy emblem, a writing, an alphanumeric character, a depiction of an object, or a part thereof.

The security element of the present invention can be used for the prevention of counterfeit or reproduction, on a document of value, right, identity, a security label or a branded good. Using coating compositions resulting in different colour flop the security element according to invention can be so constructed that two adjacent portions of a coating show different colours depending on the viewing angles.

In a preferred embodiment the first surface portion shows a first colour at a first viewing angle, while the second surface portion shows a second colour at the first viewing angle. At a second viewing angle the first surface portion shows the second colour and the second surface portion shows the first colour. Preferably the colours used exhibit a high colour contrast.

A method of producing the security element, comprises the steps of a) providing a substrate having a surface, which surface may contain indicia or other visible features;

b) applying, on top of at least part of the said substrate surface a coating, comprising the platelet shaped transition metal particles and a curable transparent binder, and (c) curing said coating layer.

As decribed above, the surface of the substrate may have an OVI on its surface, or a layer on the substrate may have an OVI on its surface. The coating, comprising the platelet shaped transition metal particles and a curable transparent binder, is applied on top of at least part of the said OVI.

An object of value, right, identity, security label, branded good, can be tested for authenticity by checking whether a colour change in dependence from the viewing angle is present.

Various aspects and features of the present invention will be further discussed in terms of the examples. The following examples are intended to illustrate various aspects and features of the present invention, but not to limited the scope of the present invention.

EXAMPLES

Example 1

20 g of the copolymer prepared according to Example 2 from WO 2004/045755 A2 (40 w/w dispersion in water), 20 g of ethyleneglycol and 6 g of MPEG-5000-thiol are dissolved in 1950 ml of de-ionized water in a thermostated 10 l reactor, equipped with an efficient stirrer. After cooling to −1° C., 10.2 g (60 mmol) of $AgNO_3$ are added and the obtained solution is gently stirred for 15 min. 4.54 g (120 mmol) of $NaBH_4$ are dissolved in 1 l of de-ionized water in a separate vessel and cooled to 0° C. This solution is rapidly added in one portion to the above solution of $AgNO_3$ with vigorous stirring (500 rpm). The reaction mixture is vigorously stirred (500 rpm) for 5 min at 0° C. and then warmed up to 20° C. with gentle stirring over 1 h. 150 ml of $H_2O_2$ (50% w/w solution in water) is added at a rate of 3 ml/min to the mixture with vigorous stirring (350 rpm) to obtain a dark-blue dispersion of silver platelets.

Water is evaporated to the volume of 200 ml, and the residual dispersion is centrifuged at 8000 G for 30 min. The supernatant is decanted; the precipitate is rinsed with de-ionized water (2×40 ml) and re-dispersed in 200 ml of 1,4-dioxan under ultra-sonication. The dispersion is centrifuged at 8000 G, the supernatant is discarded and the precipitate is redispersed in EtOAc to obtain a dispersion of 6.3 g of silver platelets.

Example 2

Two solutions are prepared:

Solution A: 7 g of the copolymer prepared according to Example 2 from WO 2004/045755 A2 (40% w/w dispersion in water) and 1.2 g of MPEG-5000-thiol are dissolved in 20 ml of de-ionized water and cooled to 0° C. Then, a solution of 2.04 g (12 mmol) of $AgNO_3$ in 23 ml of de-ionized water is added with stirring, and the resulting mixture is cooled to 0° C.

Solution B: 0.908 g (24 mmol) of $NaBH_4$ and 0.07 ml (ca. 1.15 mmol) of 28% w/w ammonia solution in water are dissolved in 49 ml of de-ionized water and cooled to 0° C.

Synthesis: Solutions A and B are pumped with equal flow rates (30 ml/min) into a three-way connector (inner diameter of the inlets 1 mm). The resulting dispersion of spherical Ag particles is continuously drained from the third outlet (inner diameter 3 mm) of connector into a 1 l round-bottom flask, pre-cooled to 0° C., containing 0.05 ml of TEGO Foamex 1488 defoamer and stirred for 10 min at this temperature. The mixture is then heated to 45° C. and treated with 20 ml of $H_2O_2$ (50% w/w solution in water) at a rate of 0.6 ml/min with vigorous stirring to obtain a dark-blue dispersion of silver platelets. The dispersion is centrifuged at 8000 G for 30 min, followed by decanting the supernatant and rinsing the precipitate with de-ionized water (2×40 mL). The precipitate is re-dispersed in 200 ml of 1,4-dioxan under ultra-sonication. The dispersion is centrifuged at 8000 G, the supernatant is discarded and the precipitate is re-dispersed in EtOAc to obtain a dispersion of 1.23 g of silver platelets.

FIG. 1 is a Transmission Electron Micrograph (TEM) of the irregularly-shaped silver platelets obtained in Example 2.

Example 3

Two solutions are prepared:

Solution A: 8 g of the copolymer prepared according to Example 2 from WO 2004/045755 A2 (40% w/w dispersion in water) and 1.2 g of MPEG-5000-thiol are dissolved in 20 ml of de-ionized water and cooled to 0° C. Then, a solution of 2.04 g (12 mmol) of $AgNO_3$ in 23 ml of de-ionized water is added with stirring, and the resulting mixture is cooled to 0° C.

Solution B: 0.908 g (24 mmol) of $NaBH_4$ and 0.07 ml (ca. 1.15 mmol) of 28% w/w ammonia solution in water are dissolved in 49 ml of de-ionized water and cooled to 0° C.

Synthesis: Solutions A and B are pumped with equal flow rates (30 ml/min) into a three-way connector (inner diameter of the inlets 1 mm). The resulting dispersion of spherical Ag particles is continuously drained from the third outlet (inner diameter 3 mm) of connector into a 1 l round-bottom flask, pre-cooled to 0° C., containing 0.05 ml of TEGO Foamex 1488 defoamer and stirred for 10 min at this temperature. The mixture is then heated to 45° C. and treated with 20 ml of $H_2O_2$ (50% w/w solution in water) at a rate of 0.6 ml/min with vigorous stirring to obtain a dark-blue dispersion of silver platelets. The dispersion is centrifuged at 8000 G for 30 min, followed by decanting the supernatant and rinsing the precipitate with de-ionized water (2×40 mL). The precipitate is re-dispersed in 200 ml of 1,4-dioxan under ultra-sonication. The dispersion is centrifuged at 8000 G, the supernatant is discarded and the precipitate is re-dispersed in EtOAc to obtain a dispersion of 1.23 g of silver platelets.

Example 4

Two solutions are prepared:
Solution A: 10 g of the copolymer prepared according to Example 2 from WO2004/045755 (40% w/w dispersion in water) and 1.0 g of MPEG-5000-thiol are dissolved in 16 ml of deionized water and cooled to 0° C. Then, a solution of 1.70 g (10 mmol) of $AgNO_3$ in 23 ml of de-ionized water is added with stirring, and the resulting mixture is cooled to 0° C.
Solution B: 0.756 g (20 mmol) of $NaBH_4$ and 0.067 ml (1.0 mmol) of ethylenediamine are dissolved in 50 ml of de-ionized water and cooled to 0° C.
Synthesis: Solutions A and B are pumped with equal flow rates (30 ml/min) into a three-way connector (inner diameter of the inlets 1 mm). The resulting dispersion of spherical silver particles is continuously drained from the third outlet (inner diameter 3 mm) of connector into a 1 l round-bottom flask, pre-cooled to 0° C., containing 0.05 ml of TEGO Foamex 1488 defoamer and stirred for 10 min at this temperature. The mixture is then heated to 40° C. and treated with 20 ml of $H_2O_2$ (50% w/w solution in water) at a rate of 0.5 ml/min with vigorous stirring to obtain a violet dispersion of silver platelets. The dispersion is centrifuged at 10000 G for 30 min, followed by decanting the supernatant and rinsing the precipitate with de-ionized water (2×40 mL). The precipitate is re-dispersed in 200 ml of 1,4-dioxan under ultra-sonication. The dispersion is centrifuged at 10000 G, the supernatant is discarded and the precipitate is re-dispersed in ethyl acetate (EtOAc) to obtain a dispersion of 1.02 g of silver platelets.

Example 5

Two solutions are prepared:
Solution A: 10 g of the copolymer prepared according to Example 2 from WO 2004/045755 (40% w/w dispersion in water) and 1.0 g of MPEG-5000-thiol are dissolved in 16 ml of deionized water and cooled to 0° C. Then, a solution of 1.70 g (10 mmol) of $AgNO_3$ in 23 ml of de-ionized water is added with stirring, and the resulting mixture is cooled to 0° C.
Solution B: 0.756 g (20 mmol) of $NaBH_4$ and 43 mg of polyethylene imine (Typical $M_n$ 600, Typical $M_w$ 800) are dissolved in 50 ml of de-ionized water and cooled to 0° C.
Synthesis: Solutions A and B are pumped with equal flow rates (30 ml/min) into a three-way connector (inner diameter of the inlets 1 mm). The resulting dispersion of spherical Ag particles is continuously drained from the third outlet (inner diameter 3 mm) of connector into a 1 l round-bottom flask, pre-cooled to 0° C., containing 0.06 ml of TEGO Foamex 1488 defoamer and stirred for 10 min at this temperature. The mixture is then heated to 40° C. and treated with 8.5 ml of $H_2O_2$ (50% w/w solution in water) at a rate of 0.5 ml/min with vigorous stirring to obtain a magenta-colored dispersion of silver platelets. The dispersion is centrifuged at 10000 G for 30 min, followed by decanting the supernatant and rinsing the precipitate with de-ionized water (2×40 mL). The precipitate is re-dispersed in 200 ml of 1,4-dioxan under ultra-sonication. The dispersion is centrifuged at 10000 G, the supernatant is discarded and the precipitate is re-dispersed in EtOAc to obtain a dispersion of 1.02 g of silver platelets.

Example 6

Two solutions are prepared:
Solution A: 7 g of the copolymer prepared according to Example 2 from WO 2004/045755 A2 (40% w/w dispersion in water) and 1.2 g of MPEG-5000-thiol are dissolved in 19 ml of de-ionized water and cooled to 0° C. Then, a solution of 2.04 g (12 mmol) of $AgNO_3$ in 23 ml of de-ionized water is added with stirring, and the resulting mixture is cooled to 0° C.
Solution B: 0.908 g (24 mmol) of $NaBH_4$ and 0.07 ml (ca. 1.15 mmol) of 28% w/w ammonia solution in water are dissolved in 49 ml of de-ionized water and cooled to 0° C.
Synthesis: Solutions A and B are pumped with equal flow rates (30 ml/min) into a three-way connector (inner diameter of the inlets 1 mm). The resulting dispersion of spherical Ag particles is continuously drained from the third outlet (inner diameter 3 mm) of connector into a 1 l round-bottom flask, pre-cooled to 0° C., containing 0.06 ml of TEGO Foamex 1488 defoamer and stirred for 10 min at this temperature. The mixture is then ultra-filtered 3 times (300000 polyethersulfone membrane, 5 bar), the residue is diluted with 1-methoxy-2-propanol (Dowanol) and the mixture is evaporated to the final weight of 6.5 g to provide 20% w/w dispersion of spherical silver nanoparticles in Dowanol.

Example 7

Varnish preparation: 7.15g of nitrocellulose (DHM 10-25 IPA (Nobel Enterprises, UK)) are slowly added to 92.85 g of ethyl acetate (99-100% rein, Brenntag) in a 250 mL glass bottle and gently stirred until complete dissolution at room temperature. Solid content measurements are then performed and quantity of ethyl acetate is adjusted to achieve a value of 10% solid content in the varnish preparation. General procedure for metallic ink preparation: 3 g silver pigment dispersion (0.6g of the silver particles obtained in Examples 1-6 in 2.4 g ethylacetate) are added to the above varnish in such a proportion as to adjust the pigment to binder ratio to the values indicated in Table 1. The obtained dispersion is stirred with a Dispermat at 800 rpm for 10 minutes affording a metallic ink which is printed by a handcoater (HC2, 12 micron wet film thickness) on contrast paper and a transparent PES film.

TABLE 1

Visual effects obtained with coatings, containing silver particles obtained according to Examples 1 to 6 of the present application.

| Silver Dispersion | Silver particles obtained in Ex. | Pigment/ Binder Ratio | Reflection Color | Transmission Color |
|---|---|---|---|---|
| 1 | 1[1) | 3:1.1 | Gold/Copper | Blue |
| 2 | 2[1) | 3:1.1 | Gold/Copper | Blue |
| 3 | 3[1) | 3:1.1 | Gold/Copper | Blue |

TABLE 1-continued

Visual effects obtained with coatings, containing silver particles obtained according to Examples 1 to 6 of the present application.

| Silver Dispersion | Silver particles obtained in Ex. | Pigment/ Binder Ratio | Reflection Color | Transmission Color |
|---|---|---|---|---|
| 4 | 4[1)] | 1:1.4 | Gold/Bronze | Violet |
| 5 | 5[1)] | 1:1.4 | Greenish Gold | Magenta |
| 6 | 6[2)] | 1:3.4 | Yellowish Brown | Yellowish Brown |
| 7 | [3)] | 2:1 | Violet | Green |
| 8 | 1[1)] | 1:0.1 | Silver | Opaque |

[1)] ca. 20% w/w Ag in ethyl acetate.
[2)] ca. 20% w/w Ag in Dowanol.
[3)] Mixture of the silver particles obtained in Example 1 and 6 in a ratio of 4:1; ca. 20% w/w Ag in ethyl acetate.

The obtained products show depending on the viewing angle a colour flop from gold to blue or green to violet or gold to magenta, gold to violet (depending among others on the type of silver particles) above Black and White Leneta-Cards.

Example 8

Preparation of UV-curable inks: silver particles obtained in Examples 1 to 6 are mixed with BASF SE UV varnish (1-methyl-1,2-ethanediyl)bis[oxy(methyl-2,1-ethanediyl)] diacrylate and poly(oxy-1,2-ethanediyl), whydroxy-[(1-oxo-2-propen-1-yl)oxy]-, ether with 2-ethyl-2-(hydroxymethyl)-1,3- and propanediol (3:1), Phosphite N, oligo[2-hydroxy-2-methyl-1-[4-(1-methylvinyl)phenyl]propanone], oxybis(methyl-2,1-ethanediyl)diacrylate, and tertiary amine derivate) in such a proportion as to adjust the pigment to binder ratio to the values indicated in Table 1. Solvent is evaporated at 85° C. in an oven, and the resulting ink is stirred with a Dispermat at 800 rpm for 10 minutes to afford metallic UV-curable inks, which are printed by a handcoater (HC2, 12 micron film thickness) on transparent PES film and cured at 40 m/min, 160 Watt/cm².

Example 9

The silver pigment dispersions (3.4 g of dispersion) as shown in Table 1 are mixed with nitrocellulose, n-propylacetate and Dowanol PM (0.25 g nitrocellulose, 2.75 g n-propylacetate, 2.0 g Dowanol PM) to make a coating composition with a pigment to binder ratio shown in Table 1. The coatings are printed on an RK proofer press over an aluminium foil, and white coated paper provided with a holographic image by applying a clean UV curable varnish (1-methyl-1,2-ethanediyl)bis[oxy(methyl-2,1-ethanediyl)] diacrylate and poly(oxy-1,2-ethanediyl), α-hydroxy-[(1-oxo-2-propen-1-yl)oxy]-, ether with 2-ethyl-2-(hydroxymethyl)-1,3- and propanediol (3:1), Phosphite N, oligo[2-hydroxy-2-methyl-1-[4-(1-methylvinyl)phenyl]propanone], oxybis(methyl-2,1-ethanediyl)diacrylate, and tertiary amine derivate) onto the corona treated substrate and embossing by using a shim and exposing to UV light.

The obtained products are characterized by an extremely bright OVD image and extremely strong rainbow effect, high purity and contrast and show depending on the viewing angle a colour flop from gold to blue or green to violet or gold to magenta, gold to violet (depending among others on the type of silver particles).

Example 10

Varnish preparation: 10 g of nitrocellulose (DHM 3/5 IPA (Nobel Enterprises, UK)) are slowly added to 90.00 g of ethyl acetate (99-100% rein, Brenntag) in a 250 mL glass bottle and gently stirred until complete dissolution at room temperature. Solid content measurerments are then performed and quantity of ethyl acetate is adjusted to achieve a value of 7% solid content in the varnish preparation. General procedure for metallic ink preparation: 28.6 g silver pigment dispersion (16.3 g of the silver particles obtained in ethylacetate) are added to the above varnish in such a proportion as to adjust 1:1 the pigment to binder ratio. The obtained dispersion is stirred with a Dispermat at 800 rpm for 10 minutes affording a metallic ink which is printed by gravure with a 100% to 5% step wedge cylinder, 70 l/cm screen on transparent PES and BOPP film. The ink weight printed on film corresponds to 1.26 g/m².

TABLE 1

All colour measurements in remission/transmission are effected using a spectrophometer Konica Minolta CM-512M3 (3 angles measurements at 25°, 45° and 75°) circular illumination over Black&White Leneta cards on the printed surface.

| | Geometry | L* | C* | h° |
|---|---|---|---|---|
| Step wedge 100% | | | | |
| PES on black | 25° | 15.3 | 6.2 | 68.9 |
| | 45° | 10.8 | 0.9 | 105.5 |
| | 75° | 8.5 | 1.9 | 263.6 |
| PES on white | 25° | 14.6 | 10.5 | 310.9 |
| | 45° | 11.0 | 13.1 | 295.8 |
| | 75° | 7.3 | 11.6 | 291.6 |
| Step wedge 75% | | | | |
| PES on black | 25° | 13.5 | 2.9 | 78.5 |
| | 45° | 10.4 | 1.6 | 190.9 |
| | 75° | 6.2 | 3.6 | 263.6 |
| PES on white | 25° | 17.8 | 27.5 | 293.7 |
| | 45° | 14.8 | 29.2 | 292.0 |
| | 75° | 9.8 | 25.4 | 291.9 |

The obtained prints show depending on the viewing angle a colour flop from gold and blue above Black and White Leneta-Cards.

| | Geometry | L* | C* | h° |
|---|---|---|---|---|
| Step wedge 100% | | | | |
| BOPP on black | 25° | 15.3 | 6.2 | 68.9 |
| | 45° | 10.8 | 0.9 | 105.5 |
| | 75° | 8.5 | 1.9 | 263.6 |
| BOPP on white | 25° | 15.5 | 17.5 | 302.7 |
| | 45° | 11.8 | 19.7 | 295.0 |
| | 75° | 7.2 | 15.8 | 292.0 |
| Step wedge 75% | | | | |
| BOPP on black | 25° | 13.5 | 2.9 | 78.5 |
| | 45° | 10.4 | 1.6 | 190.9 |
| | 75° | 6.2 | 3.6 | 263.6 |
| BOPP on white | 25° | 17.8 | 27.5 | 293.7 |
| | 45° | 14.8 | 29.2 | 292.0 |
| | 75° | 9.8 | 25.4 | 291.9 |

The invention claimed is:
1. A method for forming for forming an optically variable image or device on a substrate, the method comprising:
   a) forming an optically variable image (OVI) on a discrete portion of the substrate; and
   b) depositing a coating composition comprising
      platelet shaped transition metal particles having a longest dimension of edge length of from 15 nm to 600 nm and a thickness of from 2 nm to 40 nm, wherein the transition metal of the shaped transition metal particle is at least one selected from the group consisting of Cu, Au, and Pd, and a binder on at least a portion of the OVI, to obtain a coating, wherein the coating exhibits an angle dependent color change, and wherein the coating shows different colors in reflection and transmission.

2. The method of claim 1, wherein the binder comprises at least one selected from the group consisting of nitrocellulose, ethyl cellulose, cellulose acetate, cellulose acetate propionate (CAP), cellulose acetate butyrate (CAB), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester and a rosin ester resin.

3. The method of claim 1 wherein the forming comprises
a1) applying a curable compound to at least a portion of the substrate;
a2) forming an optically variable image on at least a portion of the curable compound; and
a3) curing the curable compound.

4. The method of claim 1, wherein a ratio of the platelet shaped transition metal particle to the binder in the coating composition is such that a resulting coating shows a variation of color as a function of the viewing angle.

5. The method of claim 1, wherein the transition metal of the shaped transition metal particle is Cu.

6. The method of claim 1, wherein the transition metal of the shaped transition metal particle is Au.

7. The method of claim 1, wherein the transition metal of the shaped transition metal particle is Pd.

8. The method of claim 1, wherein the platelet shaped transition metal particle has a longest dimension of edge length from 20 nm to 500 nm.

9. The method of claim 1, wherein the platelet shaped transition metal particle has a thickness from 4 nm to 30 nm.

10. The method of claim 1, wherein the platelet shaped transition metal particle has a ratio of longest dimension of edge length to thickness of at least 1.5.

11. The method of claim 10, wherein the ratio is 1.5 to 300.

12. The method of claim 1, wherein a ratio of the platelet shaped transition metal particle to the binder in the coating composition is from about 1:10 to about 10:1.

13. The method of claim 1, wherein the shaped transition metal particle comprises a hexagonal prism, a triangular prism, a truncated triangular prism, or a mixture thereof, which prisms make up more than 20% of a total number of shaped transition metal particles.

14. The method of claim 13, wherein the prisms make up more than 30% of a total number of shaped transition metal particles.

15. The method of claim 13, wherein the platelet shaped transition metal particle is monocrystalline.

16. The method of claim 1, wherein the substrate is transparent.

17. A method of preventing counterfeiting and/or reproduction of an article, the method comprising carrying out the method of claim 1, thereby forming an element, and applying the element to an article selected from the group consisting of a document of value, a document of right, a document of identity, a security label and a branded good.

* * * * *